BINARY CORE MEMORY CIRCUIT

Filed April 19, 1962 2 Sheets-Sheet 1

INVENTOR
R. A. KAENEL
BY Lucian C. Canepa
ATTORNEY

Oct. 5, 1965 R. A. KAENEL 3,210,743
BINARY CORE MEMORY CIRCUIT
Filed April 19, 1962
2 Sheets-Sheet 2

INVENTOR
R. A. KAENEL
BY Lucian C. Canepa
ATTORNEY

United States Patent Office 3,210,743

Patented Oct. 5, 1965

3,210,743

BINARY CORE MEMORY CIRCUIT

Reginald A. Kaenel, Murray Hill, N.J., assignor to Bell Telephone Laboratories, Incorporated, New York, N.Y., a corporation of New York Filed Apr. 19, 1962, Ser. No. 188,695
13 Claims. (Cl. 340—174)

Figure 1:
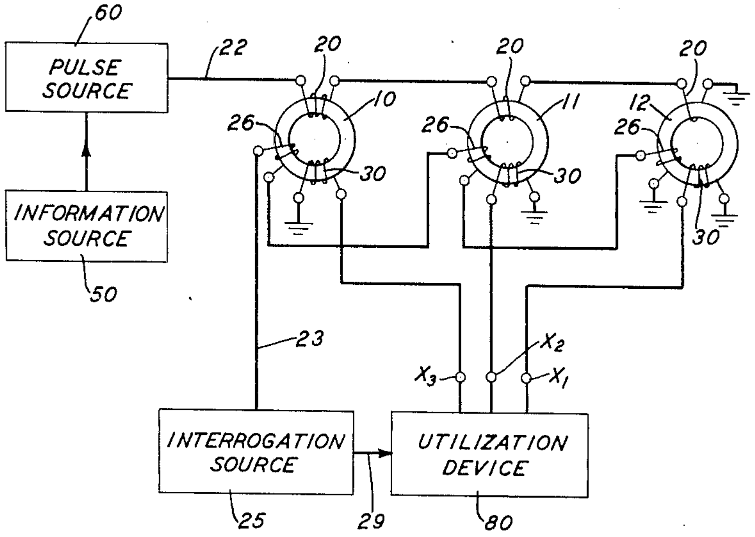

This invention relates to an information store and, more specifically, to a sequentially-addressed magnetic core information store which functions as a series-to-parallel digital converter.

Ferromagnetic materials possessing a square loop hysteresis characteristic have been widely utilized as binary information storage elements. Each of the binary characters may be represented for example, by one of the two distinct maximum remanent hysteresis polarities, and one binary bit may be stored for each element employed.

Various methods have been employed to accomplish information storage. Small permanent magnets have been used to inhibit switching in localized regions of a continuous twistor wire of the type described in A. H. Bobeck application Serial No. 675,522, filed August 1, 1957, now Patent 3,083,353, issued March 26, 1963. The intelligence in the storage system resides in the presence or absence of a magnet in close proximity to a switching region, thereby necessitating an accurate positioning of the magnet.

A second illustrative prior art information store includes a two-dimensional matrix array of ferromagnetic toroidal cores. During the storage, or write process, a simultaneous energization of a particular combination of selection axes stores one binary character in a selected core of the matrix, while any other input combination is made insufficient to switch the remanent flux of the selected core thereby storing the other binary character. Inherent in the matrix type of storage circuit is the requirement for rather intricate selection logic circuitry for each selection axis.

Other storage circuit arrangements, more complex in nature, have employed magnetic core arrays utilizing ternary, or higher order selection methods, and also multiaperture magnetic elements such as the transfluxor.

It is an object of the present invention to store binary information.

More specifically, it is an object of the present invention to provide an information storage arrangement to store a plurality of sequentially-supplied binary information-bearing bits.

Another object of the present invention is the provision of an information store which is highly reliable and does not require complicated access circuitry.

A further object of the present invention is the provision of an electronic combination lock, or control circuit, which generates an output signal in response to being supplied a required sequence of input current signals of a predetermined magnitude and polarity.

Yet another object of the present invention is the provision for an information storage arrangement which may advantageously be employed as a series-to-parallel digital converter.

These and other objects of the present invention are realized in a specific illustrative information store which includes a plurality of square loop ferromagnetic cores each of which has coupled thereto a signal winding, an interrogation winding and an output winding. The individual signal windings each contain a different number of turns, are serially interconnected and further connected to a pulse source. The interrogation windings each contain a like number of turns, are connected in series and supplied by an interrogation source. Upon their interrogation, the output windings supply a parallel voltage read-out representative of the flux condition of the cores.

The pulse source supplies current pulses of an alternating polarity and a monotonically decreasing magnitude. Each positive pulse supplied is succeeded by a negative pulse of the same magnitude which, in turn, is followed by a positive pulse of a decreased amplitude, etc. An information source is provided which causes the pulse source to delete a negative pulse in response to a binary "1" pulse supplied from the information source.

A relatively large positive pulse is first supplied to each signal winding by the pulse source, which is of sufficient amplitude to set all the cores to what will be termed the binary "1" direction. Assuming the first information bit to be stored is a "0," the pulse source supplies the next occurring negative pulse, of the same magnitude as the first positive pulse, which reverses the remanent flux contained in each core to what is termed the binary "0" direction. The succeeding positive pulse is smaller in amplitude than the two aforementioned preceding pulses and is of sufficient strength to switch all the cores to the "1" direction except that core possessing the fewest number of turns, which remains in the "0" direction, thereby storing the first information bit. Assuming the next information digit to be a binary "1," the pulse source omits the next regular negative pulse, and subsequently supplies another positive current pulse smaller than any which preceded it. This pulse is insufficient to switch the core with the fewest number of signal turns which, as noted above, is in the "0" direction, and also is insufficient to switch the core coupled to the signal winding possessing the second fewest number of turns. This latter mentioned core thus remains in the "1" direction, hence storing the binary number which had been previously supplied by the information source. Similar circuit operation continues until all the cores have sequentially been set to each store one binary bit.

When a read-out is desired, the interrogation source supplies a large current to the interrogation winding which couples a large magnetizing force to each core in its' binary "0" direction. This flux switches all the cores which were in the "1" direction thereby inducing a voltage in their respective output windings, thus indicating the nature of the stored information to a utilization device. The cores which had resided in the "0" direction undergo only a small shuttle flux change and induce no substantial voltages in their output windings.

In addition to the above-described information store, another specific embodiment of the principles of the present invention employs the basic magnetic storage arrangement as described hereinabove and functions as a control circuit, or electronic combination lock, wherein a voltage is generated at the output of an AND logic gate in response to a plurality of current signals being sequentially supplied to the embodiment in the proper polarity and magnitude.

It is thus a feature of the present invention that an information store include a plurality of magnetic cores, a plurality of signal windings each including a different number of turns and coupled to one of the cores, and wherein the individual signal windings are serially interconnected and further connected to a source supplying pulses of an alternating polarity and a monotonically decreasing magnitude.

It is another feature of the present invention that a control circuit include a plurality of signal windings in one-to-one correspondence with the plurality of cores and coupled thereto, each of the aforementioned signal windings including a different number of turns, a current source for supplying currents of a varying amplitude and polarity, interrogation means for switching the remanent flux polarity of each of the cores, and an AND logic gate responsive to the aforementioned flux reversals.

Figure 2:
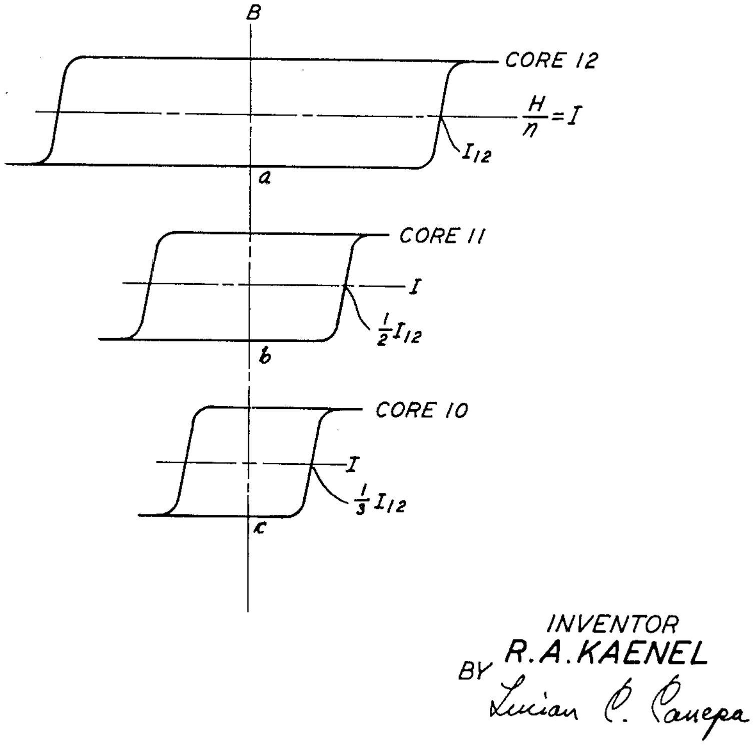
Figure 3:
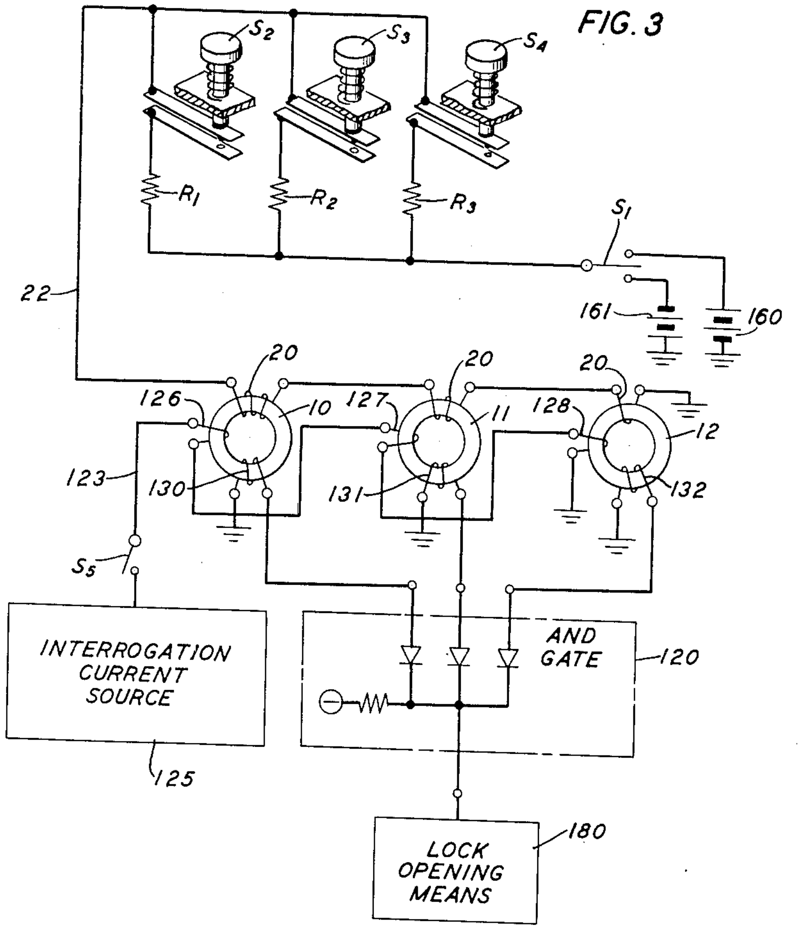
Figure 4A:
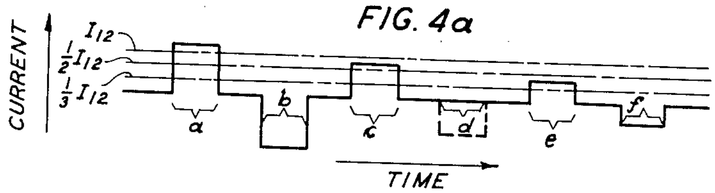
Figure 4B:
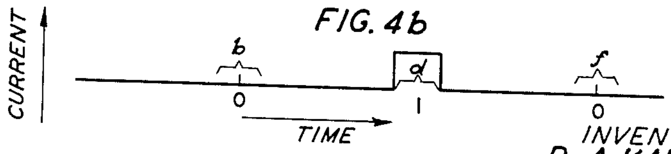

A complete understanding of the present invention and of the above and other features, variations and advantages thereof may be gained from a consideration of the following detailed description of two illustrative embodiments thereof presented hereinbelow in connection with the accompanying drawing, in which:

FIG. 1 is a schematic diagram of a specific illustrative magnetic information store which embodies the principles of the present invention;

FIGS. 2*a*, *b* and *c* are modified hysteresis characteristics of the ferromagnetic cores 12, 11 and 10, respectively, which are shown in FIG. 1;

FIG. 3 is a schematic diagram of a specific illustrative electronic combination lock circuit which embodies the principles of the present invention;

FIG. 4*a* is a time plot of the current pulses supplied by pulse source 60 shown in FIG. 1; and FIG. 4*b* is a time plot of information pulses supplied by information source 50 depicted in FIG. 1.

Referring now to FIG. 1, there is shown a specific illustrative information store which includes three square loop ferromagnetic toroidal cores 10, 11 and 12. Coupled to each core is a signal winding 20, an output winding 30 and an interrogation winding 26. The individual signal windings each contain a different number of turns, with the windings coupled to the cores 10, 11 and 12 containing, for example, 3, 2 and 1 turns, respectively. The individual signal windings are serially interconnected into signal circuit 22 which is connected in series with a pulse source 60, of a type and nature set forth in detail hereinafter. The interrogation windings 26 each contain a like number of turns, are serially interconnected into interrogation circuit 23 which is driven by an interrogation source 25. The output windings 30 each have one terminal grounded with their remaining terminals supplying parallel voltages to a utilization device 80. The utilization device 80 is enabled to receive the output information, supplied by the output windings 30, upon reception of an interrogation energization supplied by the interrogation source 25 and transmitted along a lead 29.

The pulse source 60 supplies current pulses of an alternating polarity with monotonically decreasing magnitudes. For any read-in, or write process, a sequence of equal strength, positive and negative pulse pairs are supplied, with succeeding pairs possessing diminishing amplitudes. Specifically, the first pulse supplied is positive and is followed by a negative pulse of an equal magnitude. This, in turn, is followed by a positive pulse of a smaller amplitude than either pulse which preceded it, and so forth. An information source 50 supplies to the pulse source 60 the binary intelligence which is to be stored in the cores 10 through 12. The information source 50 supplies information at the same time that the negative current pulses are supplied by the pulse source 60, and in response to a supplied binary "1" signal from the information source 50, the pulse source 60 will delete the corresponding negative current pulse.

The source 60 of monotonically decreasing, alternating polarity pulses may comprise a bipolar voltage source interconnected with a plurality of different-valued resistors, as shown in FIG. 3. Alternatively, the source 60 may advantageously comprise a monostable multivibrator supplying a bipolar output voltage to an amplifier possessing a voltage-controlled gain characteristic. Other embodiments are readily apparent to those skilled in the art.

The pulses supplied by the information source 50 may eliminate a concurrently supplied pulse from the source 60 by an inhibiting process, a great plurality of which are readily available to those versed in the art. For example, an "EXCLUSIVE OR" logic gate may be employed to supply a negative pulse from the source 60 only in the absence of a pulse from the source 50.

Modified hysteresis characteristics for the cores 12, 11 and 10 are shown in FIGS. 2*a*, *b* and *c*, respectively. The modification has adjusted the horizontal axis from a measure of the magnetizing force H normally employed to a measure of the current I which flows through the signal winding coupled to each core. As is well known, H equals NI, where N is the number of turns coupled to the core. As stated above, the windings 20 coupled to the cores 10 through 12 each contain a different number of turns, specifically 3, 2 and 1 turns, respectively. Hence, the current axes shown in FIGS. 2*a*, *b* and *c* clearly illustrate that an identical current flowing through each of the windings 20 has a different effect on the core coupled thereto. Specifically, the current axes of FIGS. 2*b* and *c* are reduced by factors of one-half and one-third, respectively. Therefore, the current necessary to generate the coercive force for each of the cores is different, and the current $I_{12}$ necessary to switch the core 12 is twice as large as that needed to switch the core 11 and three times the current required to switch the core 10. Thus, as shown, the cores are identical as far as their flux density axis is concerned, but differ as described above with respect to their horizontal current axes.

It should also be noted that the magnitude of each current pulse supplied by the pulse source 60 falls between the coercive current values of two of the cores 10 through 12 such that consecutive pulses of the same polarity are each sufficient to switch one fewer core than the one preceding it. More specifically, the positive pulse which occurs during the time interval *a* shown in FIG. 4*a* is greater than $I_{12}$ and is capable of switching all the cores, while the next positive pulse supplied during the interval *c* has an amplitude between $I_{12}$ and $\frac{1}{2}I_{12}$ and, therefore, will switch the cores 10 and 11 but not the core 12.

A typical sequence of circuit operation for the above-described arrangement will now be described. Assume, for example, that the binary intelligence to be stored consists of the binary word 101, corresponding to binary elements $x_1$, $x_2$ and $x_3$. During the interval *a* shown in FIG. 4*a*, the pulse source 60 first supplies a large positive current pulse to each of the signal windings 20. This current is of sufficient amplitude to drive each of the cores 10 through 12 to saturation in the clockwise direction, which will henceforth be termed the binary "1" storage polarity. As the first assumed information bit supplied by the source 50 is a binary "0," as illustrated during interval *b* in FIG. 4*b*, the pulse source 60 supplies a negative pulse of the same amplitude as the preceding positive pulse, which resets each of the cores 10 through 12 to the counter-clockwise, or binary "0" direction. The next pulse supplied by the pulse source 60 is positive, but of a smaller amplitude than either of the preceding pulses. This pulse is of sufficient amplitude to switch the cores 10 and 11 back to the binary "1" storage polarity but is, however, of insufficient amplitude to switch the core 12 which is coupled to a signal winding containing only one turn. This may be observed by noting that the positive current supplied during interval *c* has a magnitude between $\frac{1}{2}I_{12}$ and $I_{12}$. Referring to FIGS. 2*a*, *b* and *c*, it is readily seen that this current is sufficient to switch the cores 10 and 11, but not the core 12. The core 12 has thereby stored a binary "0" corresponding to the first, or $x_1$ information-bearing bit. The information source 50 next transmits during time interval *d* the assumed binary "1" information digit, causing the pulse source 60 to delete the next negative pulse due during interval *d*. The source 60 supplies the next positive pulse during interval *e*. This pulse produces no net change in flux storage, as the cores 10 and 11 are already in the binary "1" flux polarity in response to the positive pulse previously supplied during interval *c*. This last provided positive pulse is of course, insufficient to switch the core 12 to the binary "1" polarity. During interval *f*, the pulse source 60 supplies the last negative pulse, as the information source 50 has supplied during the interval a "0" signal. The negative pulse will switch the core 10 to the binary "0" polarity but is insufficient to switch the core 11 away from the binary "1" direction, to which it was driven by the positive pulse delivered during interval *c*. This may again be observed from FIGS 2*b* and *c* wherein the negative pulse delivered during interval *f* is larger in amplitude than the coercive current $\frac{1}{3}I_{12}$ which is necessary to switch the core 10 but less than the coercive current $\frac{1}{2}I_{12}$ needed to switch the core 11. Hence, the cores 10 and 12 are in the binary "0" direction and the core 11 is in the binary "1" direction.

When a read-out is desired, the interrogation source 25 enables the utilization device 80 by providing an energization thereto along the lead 29 and also supplies a large positive current to the interrogation circuit 23 and thereby also to each of the interrogation windings 26. The polarity of this current is adjusted to produce a flux which tends to drive each core from the "1" to the "0" direction. Since the cores 10 and 12 are already in the "0" direction, only a small shuttle flux is switched therein and a negligible voltage appears in the output windings 30 associated with these cores. However, the core 11 switches remanent flux polarities and thereby induces a relatively large voltage in the output winding 30 associated with that core. Thus, the 010 digital information word, corresponding to the $x_1$, $x_2$, $x_3$ characters originally supplied by the information source 50, is transmitted to terminals $X_1$, $X_2$ and $X_3$ of the utilization device 80 by the output windings 30 coupled to the cores 10 through 12.

It should be noted, at this point, that three cores have been employed solely for the purpose of providing a clear and relatively simple presentation. Generalizing, *n* cores each coupled to a signal winding containing a different number of turns might well be used. In addition, it is noted that a serial read-out may be accomplished by providing each of the interrogation windings 26 with a different number of turns and supplying thereto an interrogation current comprising three pulses of increasing amplitude, which would then serially read-out the information stored in cores 10, 11 and 12. Further, it is clear that the above-described arrangement functions as a series-to-parallel converter by converting the sequential information supplied by the source 50 to coincident information supplied to the utilization device 80.

The basic storage arrangement may also be advantageously employed in an electronic combination lock embodiment as illustrated in FIG. 3. The cores 10 through 12, the signal windings 20 and the signal circuit 22 are identical in every respect to the corresponding elements described in the basic FIG. 1 storage circuit. A plurality of interrogation windings 126 through 128 are coupled to the cores, are serially interconnected and are further joined to an interrogation current source 125 through a switch $S_5$. Output windings 130 through 132 are coupled to the cores 10 through 12, respectively, and have their ungrounded output terminals connected to the input terminals of an AND logic gate 120 which, in turn, provides a signal to a lock opening means 180. A network including the parallel combination of three resistors $R_1$ through $R_3$, each serially connected to a switch $S_2$ through $S_4$, respectively, is connected in series with the signal circuit 22. A transfer switch $S_1$, which selects either a positive voltage source 160 or a negative voltage source 161, is further serially joined therewith. Resistor $R_1$ is smaller than the resistor $R_2$ which, in turn, is less than the resistor $R_3$.

The individual interrogation windings 126 through 128 are not uniform in polarity. The relative polarity of each interrogation winding with respect to the associated signal winding embodies the control feature of this combination lock arrangement. For purposes of definiteness, the interrogation windings 126 and 128 have been chosen to be of an opposite polarity, and the winding 127 of a like polarity, as their respectively associated signal windings. In every case the output winding is wound such that the flux produced by the coupled interrogation winding tends to induce a positive potential at the ungrounded terminal thereof.

For proper operation, the currents supplied to the circuit 22 via the parallel resistor network must be of a polarity and magnitude to set each of the cores 10 through 12 to a remanent polarity opposite to the flux produced by the interrogation winding coupled thereto. These currents must, of course, be supplied in a monotonically decreasing sequence to set the cores 12, 11 and 10 in that order as discussed in connection with the principles embodied in the FIG. 1 storage arrangement described hereinabove.

A proper sequence of switch operations to enable the lock opening means 180 will now be described. The switch $S_1$ must first be connected to the negative source 161 and the smallest resistor $R_1$ connected into the circuit by momentarily depressing switch $S_2$. This supplies a relatively large current to the signal windings 120 to switch each of the cores 10 through 12 to a counterclockwise remanent polarity which will henceforth be termed the "0" direction. It is to be noted that the interrogation winding 128 coupled to the core 12, which core contains the signal winding that includes the fewest number of signal turns, will produce a flux in the clockwise or "1" direction when activated by a positive interrogation current supplied by the source 125. Thus, the requisite condition that the core be set in a direction opposite to the flux to be produced by the interrogation winding is satisfied for the core 12. Next, the core 11, coupled to the second fewest number of signal turns, must be set to the "1" direction, as the interrogation winding 127 coupled to the core 11 produces a flux in the binary "0" direction. This is accomplished by connecting the transfer contact of the switch $S_1$ to the positive voltage source 160 and depressing the switch $S_3$ to generate a positive signal switching current of an intermediate magnitude. While this current is also sufficient to switch the core 10 to the "1" direction, it is insufficient to alter the flux state of the core 12 which remains in the "0" polarity. This may be readily observed by reference to the hysteresis characteristics illustrated in FIG. 2 and the discussion relative thereto contained hereinabove.

The interrogation winding 126 coupled to the core 10 shown in FIG. 3 is of the same polarity as the winding 128 coupled to the core 12. Hence, the core 10 must also be set to the "0" direction. Switch $S_1$ should then be reconnected to the negative source 161 and the switch $S_4$ depressed, thereby supplying a relatively small current of sufficient magnitude to switch the core 10 to the "0" direction while being of an insufficient amplitude to affect the remanent hysteresis states of the cores 11 and 12 because of their relatively fewer number of signal winding turns.

At this time, the switch $S_5$ may be closed thereby supplying a positive interrogation current from the source 125 to each of the individual interrogation windings 126 through 128. The flux produced by these interrogation windings is of an opposite polarity as the remanent magnetization state of each core. The interrogation current causes the cores to reverse their magnetization states thereby inducing a positive signal in each of the output windings 130 through 132. These positive signals, simultaneously appearing at all the inputs of the AND gate 120, switch the AND gate thereby supplying a pulse to the lock opening means 180 which, for example, may embody a voltage-controlled relay which may advantageously operate a locking bolt.

Thus, by activating the switches $S_1$ through $S_4$ in the particular manner described above, the cores 10, 11 and 12 are respectively set to the "0," "1," and "0" storage polarities. Then, by closing the switch $S_5$, and thereby interrogating the cores 10 through 12, a pulse is supplied via the AND gate 120 to the lock operating means 180.

Following this interrogation, the cores are all in the incorrect remanent states to operate the operating means 180 in response to further interrogation energizations. By identically following a sequence of switch operations as described hereinabove, however, the cores 10 through 12 will once again be enabled to generate coincident output voltages upon being interrogated.

Assume now that the switches had not been depressed in their proper order. Assume, for example, that the above-described sequence was identically followed except that in the final step the switch $S_3$ was depressed instead of the switch $S_4$. This would have supplied a current sufficient in strength to switch the core 10 to the desired "1" magnetization state, but would also have switched the core 11 to the "1" state from the "0" condition in which it had previously resided. When the interrogation switch $S_5$ is closed, the interrogation flux produced in the cores 10 and 12 would oppose the remanent flux and induce an output voltage in the output windings 130 and 132. However, the flux produced by the winding 127 would not switch the core 11 but produce only a small shuttle flux change and induce only a negligible voltage in the output winding 131. Hence, only two of the three AND gate input terminals would be energized and no output supplied to the lock opening means 180. Similarly, any other incorrect sequence of switch operations will not produce an output voltage at the output terminal of the AND gate 120.

The above-described arrangement may be converted to a control circuit by connecting the signal circuit 22 to a plurality of current sources, each of which represents the accomplishment of a certain desired function. In that case, the AND gate 120 would produce no output unless the desired functions, and therefore the currents representative of these functions, are supplied in their proper order.

Summarizing some of the basic aspects of the present invention, a plurality of ferromagnetic square loop toroidal cores are coupled to serially connected signal windings, each of which contains a different number of turns. Current pulses of an alternating polarity and a monotonically decreasing magnitude are supplied to the signal windings. The pulses switch a decreasing number of cores as the signal current amplitude decreases, the cores with the greater number of turns included in their respective signal windings being switched by the greater number of the supplied pulses. By deleting certain of the supplied pulses, intelligence may be stored in the cores. Additionally, by coupling an interrogation winding to each core in a non-uniform polarity sequence, the system may be used as a control circuit or an electronic combination lock which requires monotonically decreasing pulses of a predetermined polarity sequence.

It is to be understood that the above-described arrangements are only illustrative of the application of the present invention. Numerous other arrangements may be devised by those skilled in the art without departing from the spirit and scope of the present invention. For example, twistor wires, tensor wires of the type described in U. F. Gianola application Serial No. 690,478, filed October 16, 1957, now Patent No. 3,069,661, issued December 18, 1962, or any other of the great plurality of square loop ferromagnetic devices may replace the toroidal cores 10 through 12. Also, the number of magnetic elements employed in any of the arrangements described hereinabove may be increased without any theoretical limitation. Additiontlly, the transfer switch $S_1$ and the shunt resistor network comprising $R_1$, $R_2$ and $R_3$ may be replaced by a potentiometer which has its variable tap joined to the signal circuit 22 and its remaining two terminals respectively connected to the voltage sources 160 and 161.

What is claimed is:

1. In combination in a magnetic information store, a plurality of square loop magnetic cores, a plurality of signal windings each of which includes a different number of turns, said signal windings being in one-to-one correspondence with said plurality of cores, inductively coupled thereto and serially connected together, pulse source means connected to said series-connected signal windings for supplying thereto current pulses of an alternating polarity and a monotonically decreasing magnitude, and information means connected to said pulse source means for eliminating selected current pulses of one polarity supplied by said pulse source means.

2. In combination in a magnetic information store, a plurality of ferromagnetic square loop toroidal cores, a plurality of signal windings in one-to-one correspondence with said cores, each of said signal windings containing a different number of turns, bipolar pulse source means for sequentially switching a progressively decreasing number of said cores, said source including means for supplying pulses of a progressively decreasing magnitude and an alternating polarity, said signal windings being serially interconnected and further connected to said pulse source means.

3. A combination as in claim 2 further including a plurality of interrogation windings in one-to-one correspondence with said magnetic elements and coupled thereto, an interrogation source, said interrogation windings being serially interconnected and further connected to said interrogation source.

4. A combination as in claim 3 further including a utilization device and a plurality of output windings in one-to-one correspondence with said cores and coupled thereto, each of said windings being grounded at one terminal and connected to said utilization device by its other terminal.

5. In combination in a magnetic information store, a plurality of ferromagnetic square loop toroidal cores, a plurality of signal windings in one-to-one correspondence with said cores, each of said signal windings containing a different number of turns, a pulse source for supplying pulses of a progressively decreasing magnitude and an alternating polarity, said signal windings being serially interconnected and further connected to said pulse source, a plurality of interrogation windings in one-to-one correspondence with said magnetic elements and coupled thereto, an interrogation source, said interrogation windings being serially interconnected and further connected to said interrogation source, a utilization device and a plurality of output windings in one-to-one correspondence with said cores and coupled thereto, each of said windings being grounded at one terminal and connected to said utilization device by its other terminal, and an information source supplying binary information signals to said pulse source, wherein said pulse source deletes a pulse in response to each binary signal of a predetermined character supplied by said information source.

6. In combination in an information storage arrangement, a plurality of square hysteresis loop magnetic elements, a plurality of means in one-to-one correspondence with said magnetic elements and coupled thereto for reversing the remanent hysteresis polarity of said coupled magnetic elements and a pulse source means for supplying to said plurality of means pulses of an alternating polarity in monotonically decreasing amplitude, each of said remanent polarity reversing means supplying to its corresponding magnetic element a different strength magnetic field in response to a pulse from said pulse source means.

7. A combination as in claim 6 further including means coupled to each of said magnetic elements for supplying an interrogation flux to each of said magnetic elements, and an interrogation source, said interrogation means supplying a flux to set all of said magnetic elements to a like magnetization condition in response to being energized by said interrogation source.

8. A combination as in claim 7 further including an information source supplying binary information signals to said pulse source means, wherein said pulse source means deletes a pulse in response to each binary signal or a predetermined character supplied by said information source.

9. In combination in an electronic combination lock circuit, a plurality of ferromagnetic square loop cores, a plurality of signal windings in one-to-one correspondence with said cores, each of said signal windings containing a different number of turns, a network including a plurality of parallel branches in one-to-one correspondence with said plurality of ferromagnetic cores, a plurality of single pole, single throw switches and a plurality of resistors, each of said resistors being of a different value, each of said plurality of network parallel branches including the series combination of one of said switches and one of said resistors, and means for supplying a voltage of either polarity, said signal windings, said network and said voltage supplying means all being serially interconnected.

10. A combination as in claim 9 further including a plurality of interrogation windings in one-to-one correspondence with said plurality of cores and coupled thereto, and means for supplying an interrogation current, said interrogation current supplying means and said interrogation windings being connected together in series.

11. A combination as in claim 10 including a plurality of output means in one-to-one correspondence with said plurality of cores and coupled thereto, each of said output means including a winding for sensing a flux reversal in said associated core, output utilization means, and an AND logic gate including an output terminal and a plurality of input terminals in one-to-one correspondence with said plurality of output sensing means and respectively connected thereto, said output utilization means being connected to the output terminal of said AND logic gate.

12. In combination, a plurality of binary storage elements, means for storing binary information in each of said binary storage elements including bipolar pulse source means for sequentially switching a progressively decreasing number of said binary storage elements, said source including means for supplying pulses of a progressively decreasing magnitude and an alternating polarity.

13. A combination as in claim 12 further including means for interrogating said binary storage elements, and a plurality of output sensing means in one-to-one correspondence with said binary storage elements for providing an output signal in response to an interrogation of said elements.

References Cited by the Examiner

UNITED STATES PATENTS 2,962,704 11/60 Buser .............. 307—88 X

IRVING L. SRAGOW, *Primary Examiner.*